(12) United States Patent
Wood

(10) Patent No.: US 6,366,372 B1
(45) Date of Patent: Apr. 2, 2002

(54) BURST MODE WAVELENGTH MANAGER

(75) Inventor: Nigel R Wood, Brackley (GB)

(73) Assignee: Marconi Communications Limited (GB)

( * ) Notice: Subject to any disclaimer, the term of this patent is extended or adjusted under 35 U.S.C. 154(b) by 0 days.

(21) Appl. No.: 09/012,888

(22) Filed: Jan. 23, 1998

(30) Foreign Application Priority Data

Jan. 24, 1997 (GB) .............................................. 9701488

(51) Int. Cl.⁷ .......................... H04J 14/02; A04B 10/00
(52) U.S. Cl. ...................... 359/110; 359/139; 359/158; 359/161; 359/173
(58) Field of Search ................................. 359/133, 161, 359/158, 173, 139, 179, 110, 177

(56) References Cited

U.S. PATENT DOCUMENTS

| | | | |
|---|---|---|---|
| 3,835,455 A | * 9/1974 | Abbenante | 340/172.5 |
| 4,479,701 A | * 10/1984 | Newton et al. | 350/96.16 |
| 4,562,582 A | * 12/1985 | Tokura et al. | 375/87 |
| 4,738,503 A | * 4/1988 | Desurvire et al. | 350/96.15 |
| 4,989,201 A | * 1/1991 | Glance | 370/3 |
| 5,153,933 A | * 10/1992 | Smith et al. | 385/27 |
| 5,381,230 A | * 1/1995 | Blake et al. | 356/345 |
| 5,475,679 A | * 12/1995 | Munter | 359/117 |
| 5,499,244 A | * 3/1996 | Mosch et al. | |
| 5,715,074 A | * 2/1998 | Netsu | 359/110 |
| 5,729,347 A | * 3/1998 | So | 356/416 |
| 5,734,486 A | * 3/1998 | Guillemot et al. | 359/139 |
| 5,760,948 A | * 6/1998 | Bigo | 359/326 |
| 5,920,414 A | * 7/1999 | Miyachi et al. | 359/133 |
| 5,999,293 A | * 12/1999 | Manning | 359/139 |

OTHER PUBLICATIONS

"Ber Measurements in Random Access Fibre Loop Optical Memory", Electronics Letters 15th Aug. 1991, vol. 27 No. 17, pp. 1585–1586, 1991.*
"High–Speed, Burst–Mode, Packet–Capable Optical Receiver and Instantaneous Clock Recovery for Optical Bus Operation" by Yusuke Ota et a. 1994, IEEE, pp. 325–331.*
"Fiberoptic Based Recirculating Memory Loop", 1992 IEEE, pp. 677–680.*

* cited by examiner

*Primary Examiner*—Leslie Pascal
(74) *Attorney, Agent, or Firm*—Kirschstein, et al.

(57) ABSTRACT

An optical network operating with burst mode data traffic signal comprises a recirculating optical loop memory which includes taking a sample of a burst mode data traffic signal and storing the sample within the recirculating optical loop memory. The network may further comprise a scanning based wavelength measurement system wherein the wavelength of the sample may be determined.

6 Claims, 3 Drawing Sheets

BURST MODE WAVELENGTH MANAGER

BACKGROUND OF THE INVENTION

The present invention relates to a means of controlling the wavelength of optical Wave Division Multiplex (WDM), High Density Wave Division Multiplex (HDWDM) or coherent-based transmitters in localized or distributed networks operating in burst mode (BM). Due to the Burst Mode Transmitters (BMTx) only transmitting data (and hence a detectable optical signal) for a very short time interval, standard wavelength control systems would have insufficient time to measure the BMTx wavelengths. The measurement system of the present invention "stores" the optical BM data stream transmitted by each BMTx and presents this to a scanning based wavelength measurement system to measure the BMTx wavelength and hence determine the required wavelength correction. This would be applicable in Multi-wavelength Passive Optical Networks (PONs) for management of upstream traffic BMTx units.

SUMMARY OF THE INVENTION

According to the present invention there is provided an optical network operating with burst mode data traffic signals comprising a recirculating 8 optical loop memory including means to take a sample of a burst mode data traffic signal and to store the sample within the recirculating optical loop memory.

The present invention will now be described by way of example, with reference to the accompanying drawings, in which:

DETAILED DESCRIPTION OF THE PREFERRED EMBODIMENTS

Figure 1:
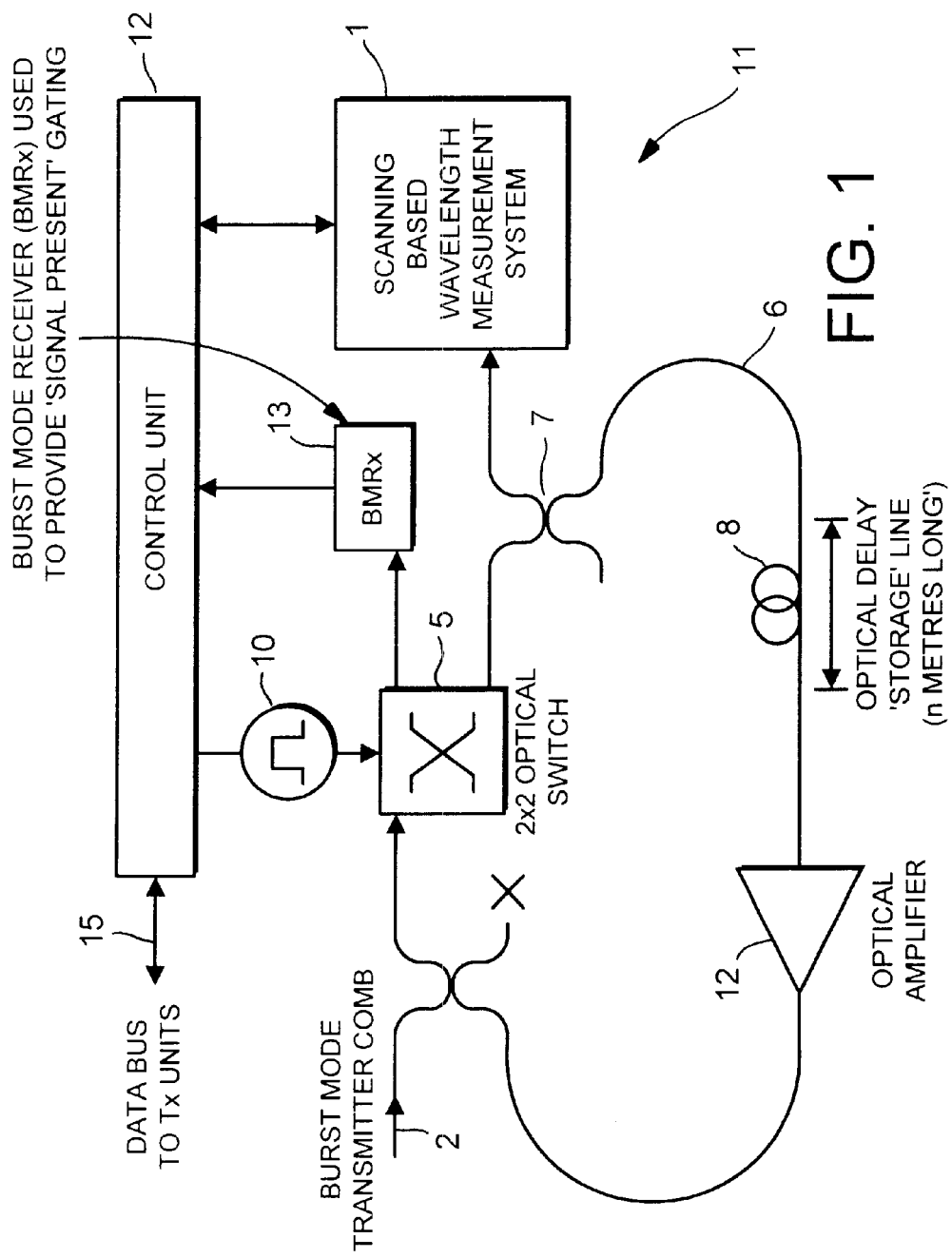
FIG. 1 shows a schematic drawing of a Burst Mode Wavelength Management System using "signal present gating"

Considering the figures, a Burst Mode Wavelength Manager (BMWM) system 11 is illustrated using a Scanning Heterodyine or Scanning Filter based spectrometer (Scanning-based Wavelength Measuring System) 1, which monitors a BMTx comb 2. The comb 2 is produced by combining the BMTx signals 3.1–3.n from the transmitter units 9.1–9.n in a Passive Optical Network (PON) 4.

A 2×2 optical switch 5 is used to sample the incoming BMTx comb 2 allowing a short optical pulse to enter a recirculating optical loop memory 6.

A coupler 7 allows a portion of the comb travelling round the loop memory 6 to be tapped off and delivered to the Scanning-based Wavelength Measuring System 1. The optical switch 5 is then used to empty the loop memory 6 before the system is reset ready for another sample.

The length of the loop memory 6, typically single mode fibre based, is set by providing an optical delay storage line 8 of such a length that the gating period width only fills about 90% of the loop memory 6. For example, for a 100 ns gating period width the storage line 8, which would form the major part of the loop memory would be approximately 30 Km long. An optical amplifier 9 is included in the loop memory 6 to compensate for the round trip optical losses (couplers, fibre loss, splices, connectors, etc.). The optical amplifier 9 ideally should be wavelength flattened across the wavelength band of interest for both wavelength and power.

The frequency correction is calculated at a control unit 12 (required wavelength minus the measured wavelength from Scanning based Wavelength Measurement System 1), and the result is transmitted by a data bus 15 to the appropriate BMTx unit 9.1–9.n using a dedicated electrical connection (i.e. wire, twisted pair, RS232, RS422 or other point to point interface), electrical interface bus, (i.e. RS485, IEEE488, SCS1 or other multi-device bus-based interface) or via an optical overlay. The BMTx unit 9.1–9.n interprets this required correction, and alters the operating conditions of the unit's laser (i.e. increase/decrease laser bias currents or laser operating temperature).

Figure 2:
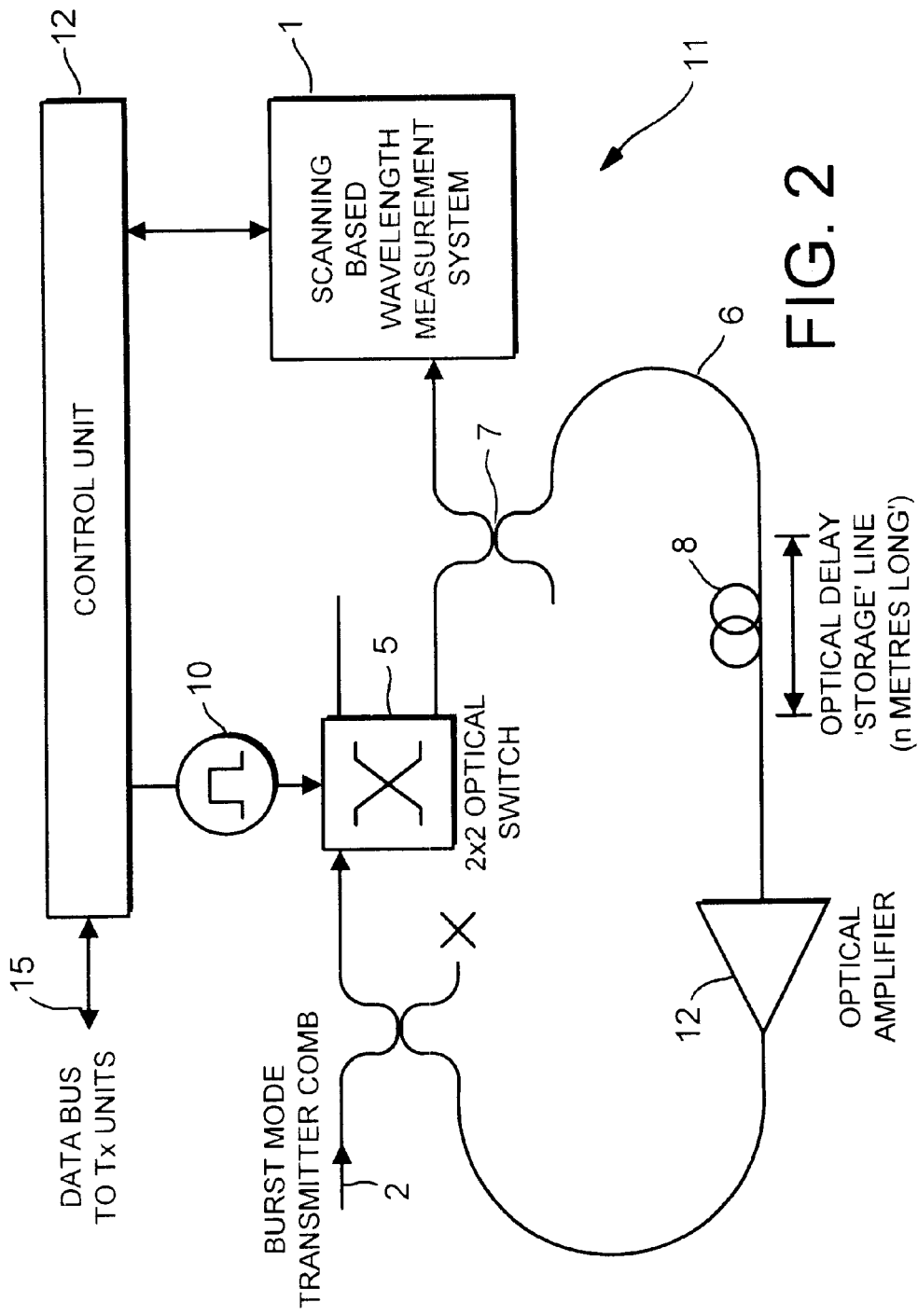
FIG. 2 shows a further schematic drawing of a Burst Mode Wavelength Management System using "self gating"
Figure 3:
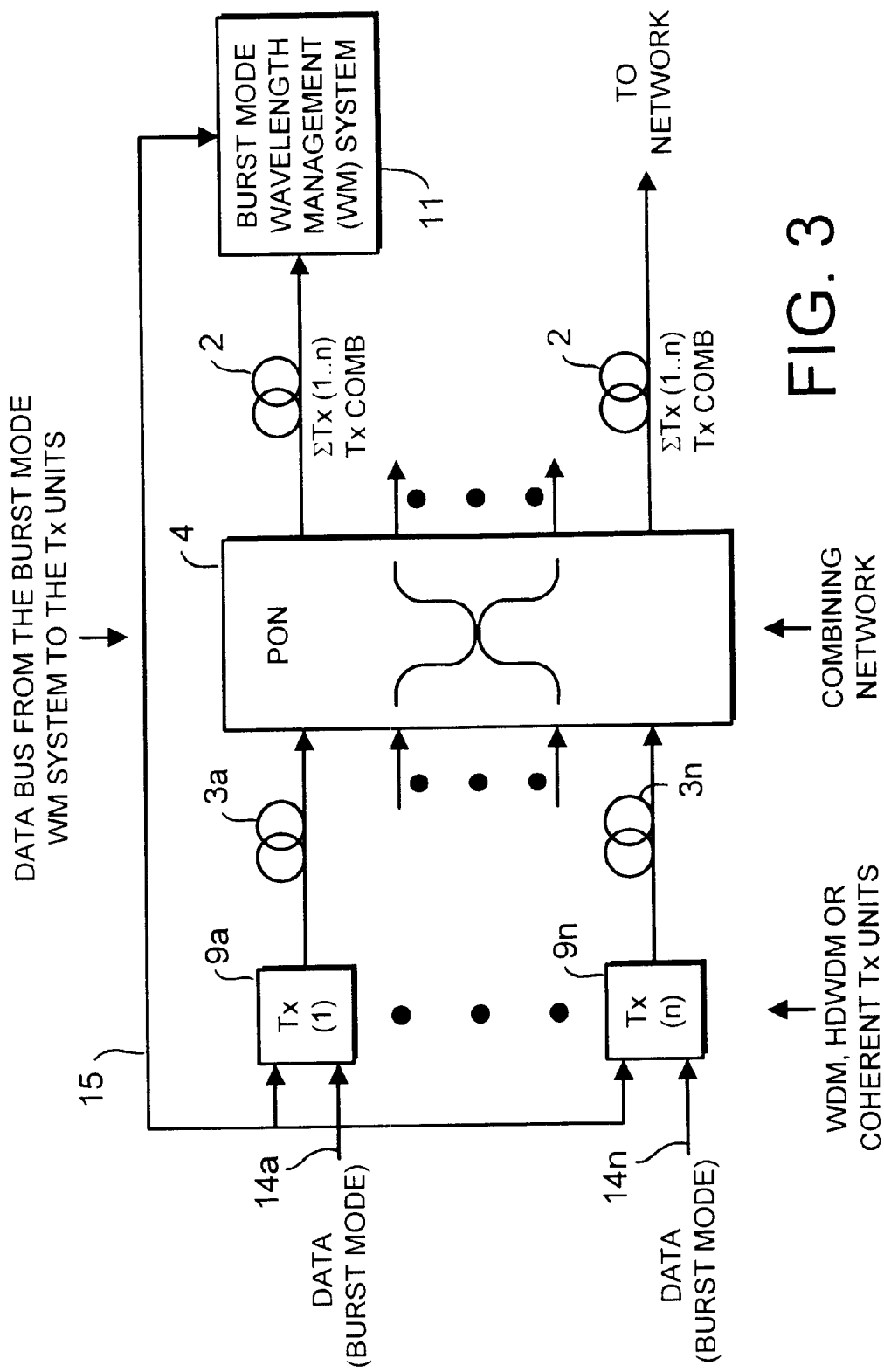
FIG. 3 shows a schematic diagram of an Optical System using the Burst Mode Wavelength Management System of FIG. 1 or FIG. 2.

Two different control schemes can be used. In the self-gating mode in FIG. 2 the output from the Scanning based Wavelength Measurement System 1 passes to the control unit 12 which provides a periodic gating pulse 10 to the optical switch 5. In this mode the BMWM 11 can only sample at set time intervals and consequently has to sample at a sufficient rate to ensure that all channels are detected.

In the signal present gating mode in FIG. 1, a Burst Mode Receiver (BMRx) 13 is attached to the second output of the optical switch 5. The BMRx 13 allows the TDMA signal to be detected and hence allows identification of the TDMA signal's source. Thus, knowing the origin of the source it possible to concentrate the sampling on an individual transmitter or group transmitters. This allows much faster diagnostic times and enables servicing of every transmitter.

I claim:

1. An optical network operating with burst mode data traffic signals comprising a recirculating optical loop memory including means for taking a sample of a burst mode data traffic signal and for storing the sample within the recirculating optical loop memory.

2. An optical network as claimed in claim 1, further comprising a scanning based wavelength measurement system for determining the wavelength of the sample.

3. An optical network as claimed in claim 2, further comprising a plurality of transmitter units and an optical combining means for generating an optical comb.

4. An optical network as claimed in claim 1, further comprising means for generating a sample control signal including a local clock.

5. An optical network as claimed in claim 1, comprising means for generating a sample control signal including a local signal present burst mode receiver.

6. An optical network as claimed in claim 2, further comprising means for calculating a frequency correction using the determined sample wavelength.

* * * * *